Figure 1:
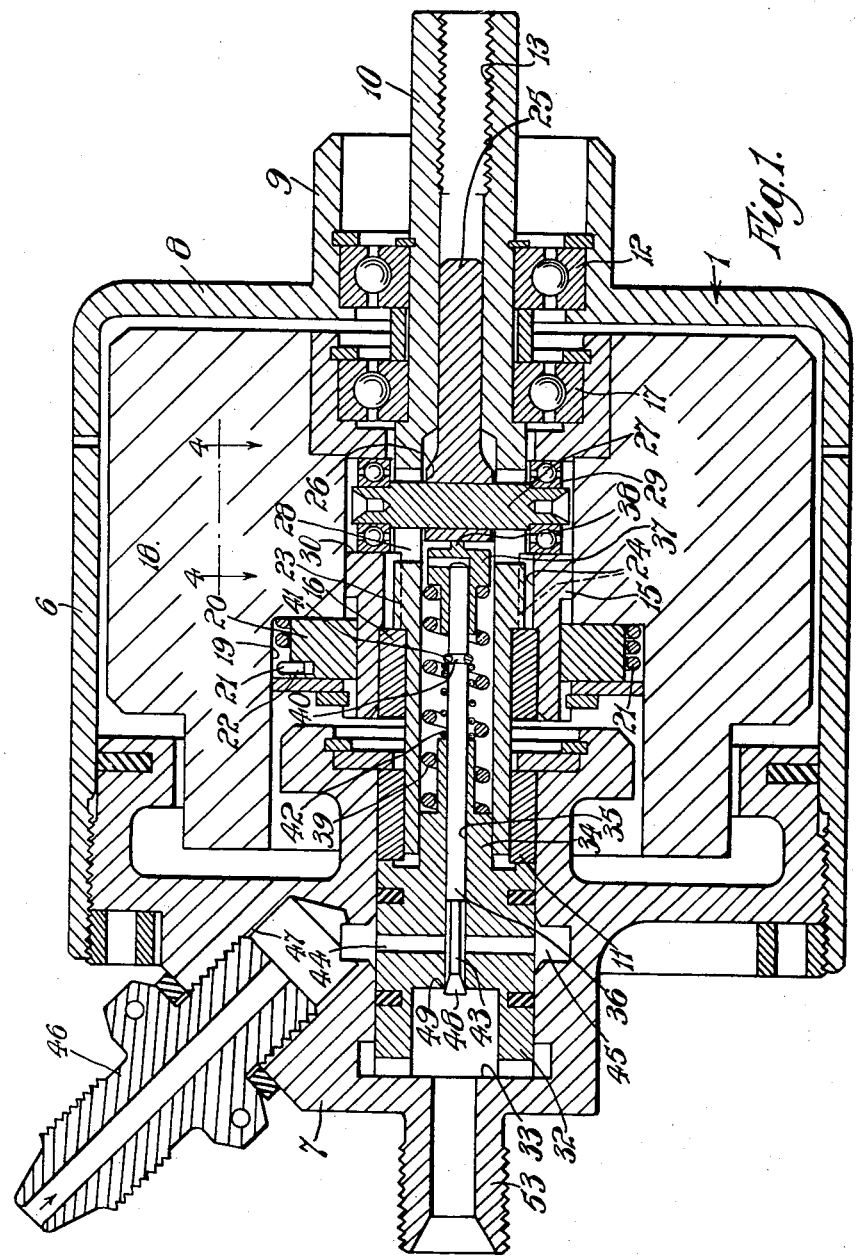

Dec. 13, 1960   F. R. MORTIMER   2,964,048
ANTI-SLIDE DEVICE FOR VEHICLE WHEELS
Filed Aug. 1, 1957   3 Sheets-Sheet 1

Inventor
Frank Radcliffe Mortimer
by Benj. T. Rauber
his attorney

Dec. 13, 1960 F. R. MORTIMER 2,964,048
ANTI-SLIDE DEVICE FOR VEHICLE WHEELS
Filed Aug. 1, 1957 3 Sheets-Sheet 2

Inventor
Frank Radcliffe Mortimer
by Benj. T. Rauber
his attorney

Dec. 13, 1960  F. R. MORTIMER  2,964,048
ANTI-SLIDE DEVICE FOR VEHICLE WHEELS
Filed Aug. 1, 1957  3 Sheets-Sheet 3

INVENTOR.
FRANK RADCLIFFE MORTIMER
BY
*Benj. T. Rauber*
ATTORNEY

United States Patent Office 2,964,048
Patented Dec. 13, 1960

2,964,048

ANTI-SLIDE DEVICE FOR VEHICLE WHEELS

Frank Radcliffe Mortimer, Styvechale, Coventry, England, assignor to Dunlop Rubber Company Limited, London County, England, a British company Filed Aug. 1, 1957, Ser. No. 675,771

Claims priority, application Great Britain Mar. 12, 1957

13 Claims. (Cl. 137—48)

This invention relates to an anti-slide device for vehicle wheels and more particularly relates to a rotary inertia-operated anti-slide device for the wheels of road vehicles.

The object of the present invention is to provide a device of the above type which is compact, relatively inexpensive and which is robust and simple in operation.

According to the present invention a rotary inertia-operated anti-slide device comprises a rotatable sleeve, means associated with a wheel or like rotatable member for rotating said sleeve and rotatable relative thereto for a limited angular distance defined by a cam member associated with said sleeve, a cam-follower associated with said means and axially-slidable within said sleeve, means to move said cam-follower in said sleeve in one direction through an axial distance defined by said cam member, operating means spring-urged to force said cam-follower in said sleeve in the opposite direction through said axial distance, a flywheel mounted on said sleeve and rotatable relative thereto and in frictional engagement therewith and valve means associated with said operating means and operable upon movement of said cam-follower in said opposite direction to restrict or prevent the flow of pressure-fluid therethrough on relative angular movement between said sleeve and said rotatable means in one direction.

According to the present invention also a rotary inertia-operated anti-slide device comprises a rotatable sleeve having a cam surface incorporated therein, an inertia mass rotatably associated with the outer periphery of said sleeve, a driven shaft, a member rotatable with said shaft and axially-slidable relative thereto and provided with a cam-follower adapted to cooperate with said cam surface, an operating means spring-pressed against said member to force said shaft and said sleeve into a relative angular position in which the cam-follower is in a predetermined position relative to said cam surface and a valve associated with the operating means and spring-closed when the shaft and the sleeve are in said angular position and adapted to be opened by axial movement of said member on relative angular movement taking place between the shaft and the sleeve.

Preferably a clutch mechanism is provided to drive the inertia mass (which comprises an annular flywheel) from the sleeve, said mechanism being adapted to provide a higher driving torque in one direction of relative rotation than in the other. Preferably also the device is associated with a vehicle fluid-pressure braking system of the type wherein a constant flow of pressure-fluid is passed through a closed circuit and the brakes are actuated by operating a valve or the like in the circuit between the pump or compressor and the reservoir or atmosphere to close this portion of the circuit and direct the pressure-fluid through a restrictor to the brakes.

Figure 2:
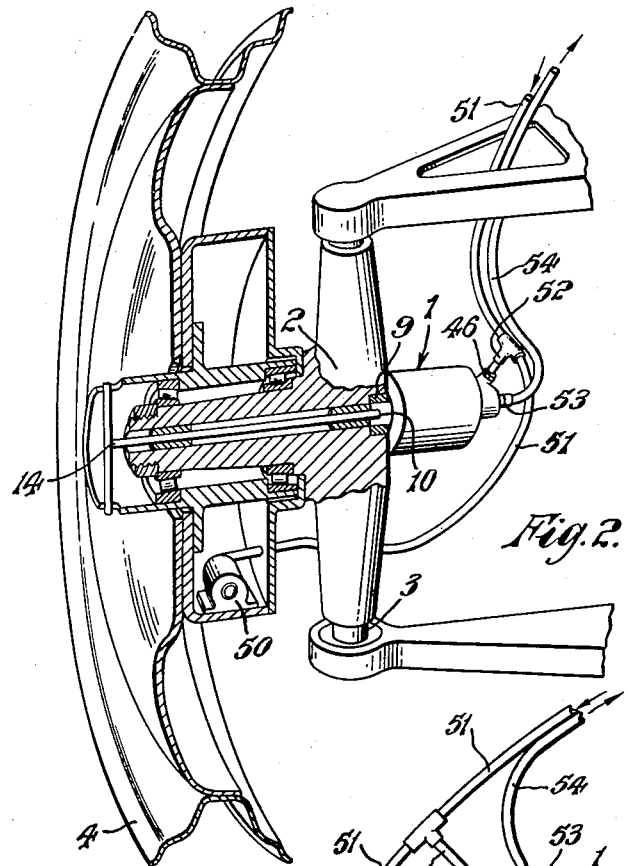
Figure 4:
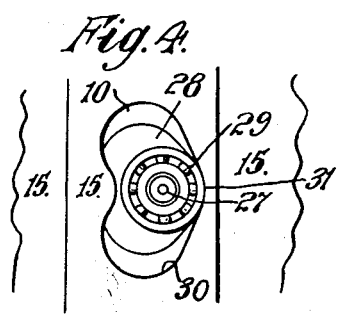
Figure 3:
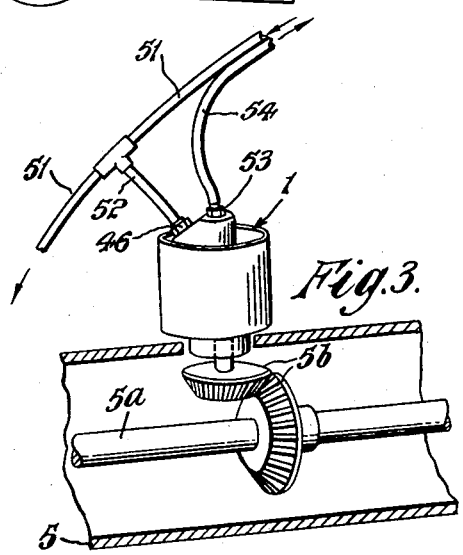
Figure 5:
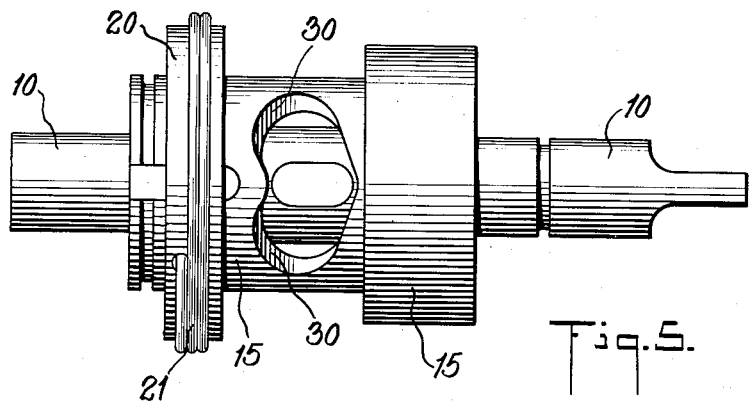
Figure 6:
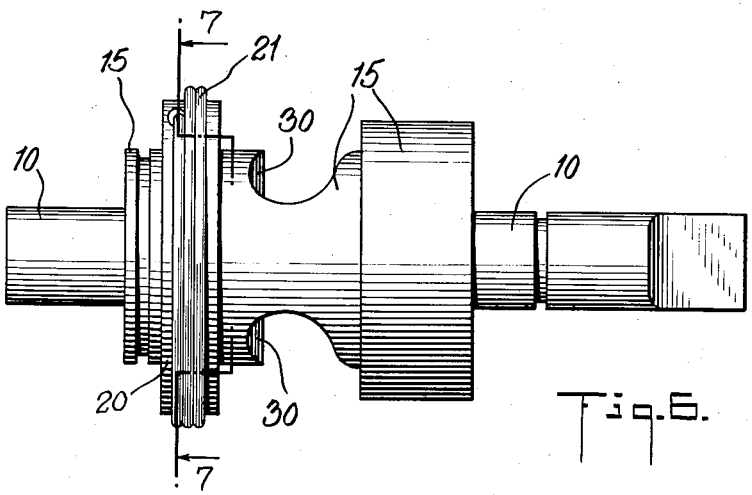
Figure 7:
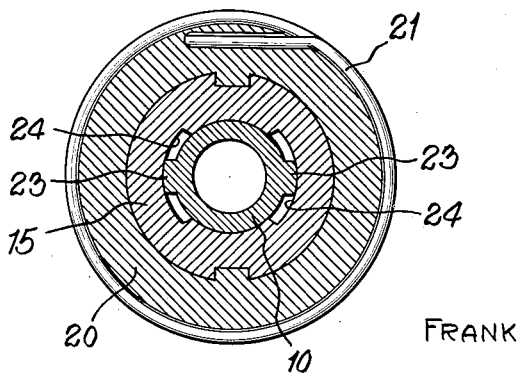

A better understanding of the invention may be obtained from the following description when this is read with reference to the accompanying drawings of which:

Figure 1 is a section through a rotary inertia device according to the invention, Figures 2 and 3 are diagrammatic views of means whereby the device may be associated with the front or rear wheels, respectively, of a vehicle, Figure 4 is a view of the cam slot and cam follower taken in the direction of the arrows 4—4 of Figure 1, Fig. 5 is a side view of an assembly of a spindle, clutch ring and cam sleeve element of the device, Fig. 6 is a side view of the assembly of Fig. 5 taken at right angles to the view of Fig. 5, and Fig. 7 is a cross section taken on the line 7—7 of Fig. 6.

As shown in Figure 1, a rotary inertia device for a road vehicle wheel comprises a non-rotatable cylindrical housing 1 secured conveniently adjacent a road wheel. For example, in a front wheel installation (Figure 2) the housing 1 may conveniently be secured to the stub-axle 2 on the side of the king-pin 3 remote from the wheel 4, whilst in a rear wheel installation (Figure 3) it may be secured to the axle casing 5 and be driven from the half shaft 5a as by suitable bevel gearing 5b.

The housing 1 comprises a cylinder 6 which is closed at one end by a closure member 7. The other end of the cylinder 6 is provided with a radially-inwardly-extending annular flange 8, the inner periphery of which is provided with an axially-outwardly-extending cylindrical boss 9.

A hollow spindle 10 is fitted co-axially within said housing 1, one end thereof being supported in a plain metal bearing 11 in the closure member and the other end being supported in ball bearings 12 in the boss 9. The bearings 11 and 16 may be of any suitable type. For free running of the hollow spindle 10 in the closure member 7 and of the sleeve 15 and associated elements on the spindle a needle type of bearing is desirable. Said other end of the spindle 10 projects outwardly from the boss 9 and is internally screw threaded as at 13, or otherwise formed, as by squaring or the like, to be driven as by suitable driving means 14 associated with the front wheel 4, or by the rear wheel transmission shaft 5a, as the case may be.

A cylindrical sleeve 15 is fitted over the spindle 10 within the housing 1 and is rotatable relative to the spindle 10 within predetermined limits. The sleeve 15 is supported on a plain metal bearing 16 at the end adjacent the closure member 7, the other end being supported on a ball bearing 17. Rotatable on the outer periphery of the sleeve 15 is an annular flywheel 18 which substantially fills the housing. Said flywheel 18 is provided, at its inner periphery and on the side adjacent the closure member 7, with an annular recess 19 of rectangular section in which is located a clutch comprising a ring 20 which is splined to the sleeve 15 and which is provided at its outer surface with a helically-coiled spring wire member 21 one end of which is secured to the ring 20 as at 22. The ring 20 rotates with the sleeve 15 and the periphery of the helically-wound spring 21 contacts the flywheel 18 and drives it with a comparatively high torque in one direction and a low torque in the other direction.

The rotatable hollow spindle 10 is provided with two diametrically-opposed outwardly-extending lugs 23 which are located in diametrically-opposed part-annular grooves 24 in the inner periphery of the sleeve 15 which are much wider circumferentially than are the lugs 23 so that, with the lugs 23 of the spindle 10 in mid-position relative to said grooves 24, the spindle 10 can make an angular movement of the order of 40° in either direction before the lugs 23 abut the circumferentially spaced edges of the grooves, when the sleeves 15 will rotate with the spindle 10. The circumferentially spaced edges of the grooves determine the "predetermined limits" referred to hereabove.

Non-rotatably and axially-slidably located within the hollow spindle 10, adjacent the driven end thereof, is a slide 25 having at one end a boss 26 to which is fitted to shaft 27 which is at right angles to the slide 25. The ends of the shaft 27 extend transversely through diametrically-opposed circumferentially-extending slots 28 in the hollow spindle 10 and said ends are each provided with a ball bearing 29 which is located in a cam slot 30 in the sleeve 15. Said cam slots 30 (Figure 4), which are diametrically opposed, are each of substantially V-shape symmetrical about the axis of the sleeve 15, the apex 31 of the V being presented away from the closure member 7 of the housing 1. Thus on relative angular movement of the spindle 10 and sleeve 15 in either direction the bearings 29 will be moved diagonally by the cam slots 30 in one direction or the other and the slide 25, associated with said bearings, will move axially up and down the hollow spindle 10.

A valve mechanism is associated with the non-rotatable closure plate 7 of the housing 1. Said mechanism comprises a cylindrical plug 32 fluid-tightly fitting in a bore 33 in the closure member 7 which is co-axial with the sleeve 15 and into which the hollow spindle 10 projects a short distance. The plug 32 comprises a cylindrical spigot part 34 which extends a short distance into the hollow spindle 10. A passage 35 extends axially through the plug 32 and spigot 34 and slidably fitting therein is an operating rod 36 which extends axially-inwardly from the spigot 34 into a spring retainer 37 having an axial projection 38 abutting the boss 26 formed as part of the slide. A spring 39 is held in compression between the spigot 34 and the retainer 37. The operating rod 36 is provided, adjacent the retainer 37, with a peripheral groove 40 in which is located a circular spring clip 41 which serves as an abutment for a helically-wound valve spring 42 held in compression between said spring clip 41 and the adjacent end of the spigot 34 which, at its extreme end, is formed to a smaller diameter to locate the spring 39.

The operating rod 36 is provided, adjacent the end remote from the spring retainer 37, with a portion 43 of reduced diameter which defines, with the passage 35 through the plug 32, an annular chamber which communicates with a source of fluid pressure through a diametrical passage 44 in the plug 32, an annular chamber 45, and a screwed adaptor 46 located in a bore 47 in the closure member 7. The outer end of the operating rod 36 is formed as a valve 48 to co-operate with the adjacent end 49 of the passage 35 through the plug 32.

The braking system is of the kind wherein a constant supply of pressure-fluid is always available for direction to the brake-actuating mechanism. In the case of a hydraulic system, it comprises a normally-closed circuit wherein the hydraulic liquid is pressurised in a pump of any suitable type and is passed from the pump into a reservoir from which the pump receives its supply of unpressurised liquid, the liquid being thus in constant circulation. In a pneumatic system a compressor is constantly producing compressed air which is normally passed to exhaust or to a pressure tank, the compressor being fitted with an unloader valve to pass the compressed air to exhaust when the tank pressure reaches a predetermined limit. Whether air or liquid is used, the general principle is the same with the exception that when hydraulic liquid is used the excess flow is passed to a reservoir instead of to exhaust.

In either case, when it is desired to apply the brakes the flow of fluid to the reservoir, or to exhaust, is interrupted by actuation of a suitable master-cylinder device or valve, and the fluid pressure is diverted to the brake actuating mechanism 50 (Figure 2) through the conduit 51. A conduit 52 is branched off from the conduit 51 and is connected to the inlet connection 46 in the closure member 7. Where the brake-actuating fluid is compressed air, the outlet connection 53 (Figure 1) of the device may be left open to atmosphere, if so desired, but where the fluid is a hydraulic liquid the connection 53 is connected to a suitable reservoir by a return conduit 54 (Figure 2).

On actuating the master cylinder or valve to apply the brakes, as aforesaid, the flow of pressure fluid to exhaust or to the reservoir is obstructed and, as the conduit 51 has been opened to this pressure flow, the pressure-fluid is diverted through the conduit 51 to the brake-actuating mechanism 50.

The ball bearings 29 associated with the slide 25 are normally located at the apices 31 of the V-shaped slots 30 in the sleeve 15, the spring 39 associated with the operating rod 36 being strong enough to maintain them in said position during normal operation of the device. In this position of the ball bearings 29 and, hence, of the slide 25 the operating rod 36 is in a position wherein the valve 48 is closed so that the brakes may be applied.

On starting the vehicle the hollow shaft 10 is driven by rotation of the wheel with which it is associated and, the ball bearings 29 of the spring-pressed slide 25 being maintained in the apices 31 of the V-slots 30, the sleeve 15 is rotated by the slide 25 without relative angular movement. The clutch rotates with the sleeve 15, the helically-wound element 21 driving the flywheel 18 with a fairly high torque so that, after a very short delay, the flywheel 18 is rotating at the same angular velocity as the sleeve 15. If the vehicle should have been accelerated at such a rate that the ball bearings 29 are moved to one end or the other of the V-shaped slots 30 then the valve 48 will open. This, however, is no disadvantage, since it is unlikely that the brakes would have to be applied during acceleration.

If the brakes are applied in such a manner as to cause a gradual deceleration of the vehicle, without slipping of the wheels, then the ball bearings 29 will remain in their normal positions intermediate the ends of the V-shaped slots 30, and the valve 48 will remain closed.

If, however, the braking is such as to cause one or more wheels to slide or skid on the supporting surface, then the shaft 10, driven by the wheel, will check or slow down and the greater mass of the flywheel 18 and sleeve 15 together will overrun the shaft 10, until the lugs 23 on the shaft abut one of the circumferentially spaced edges of the grooves 24 on opposite sides of the sleeve 15. In this relative position of parts each ball bearing 29 is at one end of its associated V-slot 30 and the operating rod 36 has been moved against its spring 39 to open the valve 48. The pressure built up at the brakes thus flows back through the conduit 51 and through the valve 48 to atmosphere or to the reservoir and the brakes are relieved. At the same time pressure flowing from the source of pressure through the conduit 51 is relieved by the valve 48 before it can reach the mechanism 50, and the brakes cannot be applied so long as the valve 48 remains open.

With the wheel rotating normally once more, the operating rod return spring 39 once more centres the ball bearings 29 in their slots 30, which closes the valve 48 and permits the brakes to be re-applied. This sequence of operations happens very rapidly, the valve 48 hunting between an "on" and an "off" position, the mean effect being that the braking pressure applied to the brakes is just sufficient to provide maximum deceleration without skidding irrespective of the braking pressure applied through the master-cylinder or valve.

During the period of the overrun, i.e. with the shaft 10 stationary and the flywheel 18 running on, only a light torque is provided between the helically-wound element 21 of the clutch and the flywheel 18, so that the inertia of the flywheel 18 will not be greatly reduced during a prolonged skid.

The helical member 21 is inserted in the annular space between the periphery of the ring 20 and the recess 19 in the flywheel 18 in such a manner that the periphery of the helical member 21 bears lightly against the adjacent surface of the recess 19. One end of the helical member 21 is secured to the ring 20 as, for example, at 22. The "lay" of the helical member 21 is such that if the flywheel 18 is overrunning the sleeve 15 and ring 20 the light friction between the periphery of the helical member 21 and the flywheel 18 tends to "wind up" the helical member 21 and so reduce its peripheral diameter. On the other hand, if the flywheel 18 is rotating at a slower speed than the sleeve 15 and ring 20 the initial light friction between the helical member 21 and the flywheel 18 tends to unwind the helical member 21, thus increasing its diameter and pressing it more firmly against the recess 19 in the flywheel 18, and, as a result, increasing its torque. Accordingly, adaptation of the device for near side or off side use merely necessitates the substitution of an oppositely-wound helix 21 or, where suitable securing means other than as shown at 22 are used, by the mere reversal of the helix 21.

Having now described my invention, what I claim is:

1. A rotary inertia-operated anti-slide device comprising a rotatable sleeve having a cam surface incorporated therein, an inertia mass rotatable on the axis of said sleeve, means frictionally engaging said mass with the outer periphery of said sleeve, a driven shaft co-axial with said sleeve, a member rotatable with said shaft and axially-slidable relative thereto and provided with a cam-follower adapted to co-operate with said cam surface, an operating means spring-pressed against said member to force said cam-follower against said cam surface to bring said shaft and said sleeve into a relative angular position in which the cam follower is in a predetermined position relative to said cam surface and a valve associated with said operating means and spring-closed when the shaft and the sleeve are in said angular position and adapted to be opened by axial movement of said member on relative angular movement taking place between the shaft and the sleeve.

2. A rotary inertia-operated device according to claim 1 wherein said inertia mass comprises an annular flywheel having an annular recess therein adjacent said sleeve, and wherein said means frictionally engaging said mass with said sleeve comprises a helically-wound spring member located in said recess with its outer periphery in frictional engagement with said recess and with one of its ends secured to said sleeve whereby relative movement between said flywheel and said sleeve in one direction produces a light frictional engagement between said helical member and said flywheel and relative movement in the other direction produces a heavy frictional engagement therebetween.

3. A rotary inertia-operated device according to claim 1 wherein said cam surface comprises a V-shaped cam slot formed in the wall of said sleeve and said cam-follower comprises a ball bearing rotatably associated with said member rotatable with and slidable relative to said shaft, said sleeve also being angularly movable relative to said shaft through a distance defined by the circumferential extent of said V-shaped cam slot.

4. A rotary inertia-operated device according to claim 1, wherein said operating means comprises an annular plug secured in a bore in said device co-axially of said sleeve and having an annular spigot extending thereinto, a helical compression spring located on said spigot and abutting the adjacent end of said relatively-slidable member, a valve member having a sealing portion engaging an annular seat at the end of said plug remote from said spigot and having a stem extending therethrough into abutment with said relatively-slidable member, a helical compression spring normally urging said valve member into sealing engagement with said seat, a portion of reduced diameter on said valve stem adjacent said sealing portion and a pressure-fluid conduit extending transversely of said plug at said reduced diameter portion of said valve stem, sliding movement of said relatively-slidable member due to movement of said cam follower into either arm of said V-shaped cam slot being adapted to unseat said valve member and permit the escape to exhaust of pressure-fluid trapped in said conduit.

5. A rotary-inertia operated anti-slide control for a vehicle wheel comprising a non-rotatable housing for attachment to a non-rotatable part of the running gear of a vehicle and having a pressure-fluid inlet, a pressure-fluid exhaust outlet and a passage from said inlet to said outlet, a valve to control the flow of fluid through said passage, a sleeve rotatable in said housing and having a cam slot inclined to the length of said sleeve, a driving member coaxial with and engaging said sleeve and rotatable on its axis at a speed determined by the speed of the vehicle wheel, a cam follower engaging said cam slot and engaged by said driving member to rotate therewith and slidable longitudinally thereof, a spring biasing said cam follower longitudinally of said driving member toward one end of said cam slot, valve operating means biased to engagement with said cam follower to close said valve when said cam follower is biased toward said end and movable by said cam follower to open said valve when said cam follower moves from said end, an inertia element rotatable about the axis of said sleeve, and a friction clutch having a frictional connection from said sleeve to said inertia element to provide a greater frictional engagement in one direction of rotation than in the opposite direction of rotation.

6. The rotary inertia control of claim 5 in which said driving member has a lost motion engagement with said sleeve.

7. The rotary inertia control of claim 5 in which said friction clutch comprises a coil spring anchored at one end to said sleeve and having its coils engaging a surface of said inertia element.

8. A rotary inertia operated anti-slide device for a vehicle wheel, said device comprising a housing having an inlet, an outlet and a passage from said inlet to said outlet, a spring pressed valve closing said passage, a sleeve mounted in said housing to rotate on its axis, said sleeve having a helical cam surface, a driving element rotatable co-axially with said sleeve, said driving element and said sleeve having engaging parts spaced to permit limited forward movement of said driving element relative to said sleeve, a cam follower engaging said cam surface and rotatable by said driving element relative to said sleeve to move on said cam surface and thereby to be displaced axially of said sleeve and driving element, means operatively connecting said cam follower and valve and actuated by the displacement of said cam follower to open said valve, a rotary inertia element co-axial with said sleeve rotatable about its axis and a friction clutch between said sleeve and said rotary inertia element mounted to grip said rotary inertia element to said sleeve on forward movement of said sleeve relatively to said rotary inertia element and to engage said sleeve with said rotary inertia element by a frictional drag on reverse movement of said sleeve to rotate said sleeve forwardly relatively to said driving element and cam follower when the forward speed of said rotary inertial element is greater than that of said driving element and cam follower to shift said cam follower axially to open said valve.

9. A rotary inertia device according to claim 8 wherein said clutch comprises a helically-wound spring member having one end secured to said sleeve and its outer periphery in light frictional engagement with said flywheel whereby relative movement between said flywheel and said sleeve in one direction is adapted to reduce the degree of said frictional engagement and said relative movement in the other direction is adapted to increase said frictional engagement.

10. The rotary inertia operated anti-slide device of claim 8 in which said cam surface comprises a pair of V-shaped slots on diametrically opposite portions of the wall of said sleeve, and said cam follower comprises a member extending transversely of said sleeve through said slots and in which said driving member has longitudinally extending slots in which said transverse member slides longitudinally of said sleeve.

11. The rotary inertia device of claim 10 in which said transverse member has a ball bearing rotatably mounted thereon and engaging the edges of said slots.

12. The rotary inertia device of claim 10 having a spring confined between a portion of said housing and said cam follower resiliently biasing said cam follower to the apices of said slots.

13. The rotary inertia device of claim 8 in which said means connecting said cam follower and said valve comprises a push rod extending from said valve to a connection with said cam follower, said valve having a spring biasing said rod toward said cam follower and biasing said valve toward closed position.

References Cited in the file of this patent

UNITED STATES PATENTS

| 2,163,731 | Hallot | June 27, 1939 |
| 2,761,495 | Greenland | Sept. 4, 1956 |
| 2,766,853 | Trevaskis et al. | Oct. 16, 1956 |
| 2,772,904 | Doolittle | Dec. 4, 1956 |
| 2,818,244 | Ropar | Dec. 31, 1957 |

FOREIGN PATENTS

| 203,892 | Australia | Mar. 1, 1956 |
| 938,460 | Germany | Feb. 2, 1956 |
| 735,387 | Great Britain | Aug. 17, 1955 |